(12) United States Patent
Choi (10) Patent No.: US 7,697,069 B2
(45) Date of Patent: Apr. 13, 2010

(54) MULTI-INPUT AND MULTI-OUTPUT DEVICE AND TUNER FOR TWO-WAY OPENCABLE

(75) Inventor: Young-ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1396 days.

(21) Appl. No.: 11/043,047

(22) Filed: Jan. 27, 2005

(65) Prior Publication Data

US 2005/0265084 A1 Dec. 1, 2005

(30) Foreign Application Priority Data

May 29, 2004 (KR) .................... 10-2004-0038728

(51) Int. Cl.
*H04N 5/46* (2006.01)
(52) U.S. Cl. .................. 348/555; 348/565; 348/725; 348/705
(58) Field of Classification Search ......... 348/553–556, 348/558, 570, 725–726, 731–732, 705–706; 725/39–40, 131, 139, 151
See application file for complete search history.

(56) References Cited

U.S. PATENT DOCUMENTS

| | | |
|---|---|---|
| 5,706,060 A | 1/1998 | Ruitenburg |
| 5,982,411 A * | 11/1999 | Eyer et al. ............... 725/49 |
| 6,133,910 A * | 10/2000 | Stinebruner .............. 725/49 |
| 6,700,624 B2 * | 3/2004 | Yun ....................... 348/555 |

FOREIGN PATENT DOCUMENTS

| | | |
|---|---|---|
| EP | 1507409 | 2/2005 |
| KR | 1998-013836 | 6/1998 |
| KR | 2003-54438 A | 7/2003 |
| KR | 2003-66224 A | 8/2003 |
| KR | 2004-16592 A | 2/2004 |

OTHER PUBLICATIONS

Partial European Search Report issued on Nov. 11, 2005 for EP 05103538.

* cited by examiner

*Primary Examiner*—Trang U Tran
(74) *Attorney, Agent, or Firm*—Stanzione & Kim, LLP (57) ABSTRACT

A two-way Opencable multi-input and multi-output device used with a tuner, and the multi-input and multi-output device includes an over-the-air signal input port connected for an over-the-air signal, a cable signal input port connected for a cable signal, at least one or more splitters to split the over-the-air signal or the cable signal to plural output ports, a shield cable to connect the splitter connected to the over-the-air signal input port and the splitter connected to the cable signal input port. The two-way OpenCable system can prevent transient states upon channel changes.

19 Claims, 4 Drawing Sheets

MULTI-INPUT AND MULTI-OUTPUT DEVICE AND TUNER FOR TWO-WAY OPENCABLE

CROSS-REFERENCE TO RELATED APPLICATIONS

This application claims benefit under 35 U.S.C. § 119from Korean Patent Application No.2004-38728 filed on May 29, 2004, the entire content of which is incorporated herein by reference.

BACKGROUND OF THE INVENTION

1. Field of the Invention

The present general inventive concept generally relates to a multi-input and multi-output device and a tuner for two-way OpenCable. More particularly, the present general inventive concept relates to a splitter and a tuner enabling a two-way communication system of OpenCable and a terrestrial 2 PIP function to be effectively implemented.

2. Description of the Related Art

At the present time, various broadcast media, such as analog over-the-air broadcasts, digital over-the-air broadcasts, analog cable broadcasts, and digital cable broadcasts, broadcast a variety of programs, so that devices connected to an antenna and/or cable are needed to receive different broadcast programs. Thus, a splitter is required to split signals of various formats input through the antenna or cable to corresponding receivers. Furthermore, in general, a multimedia device has a picture-in-picture (PIP) function displaying two screens on one display unit at the same time.

Figure 1:
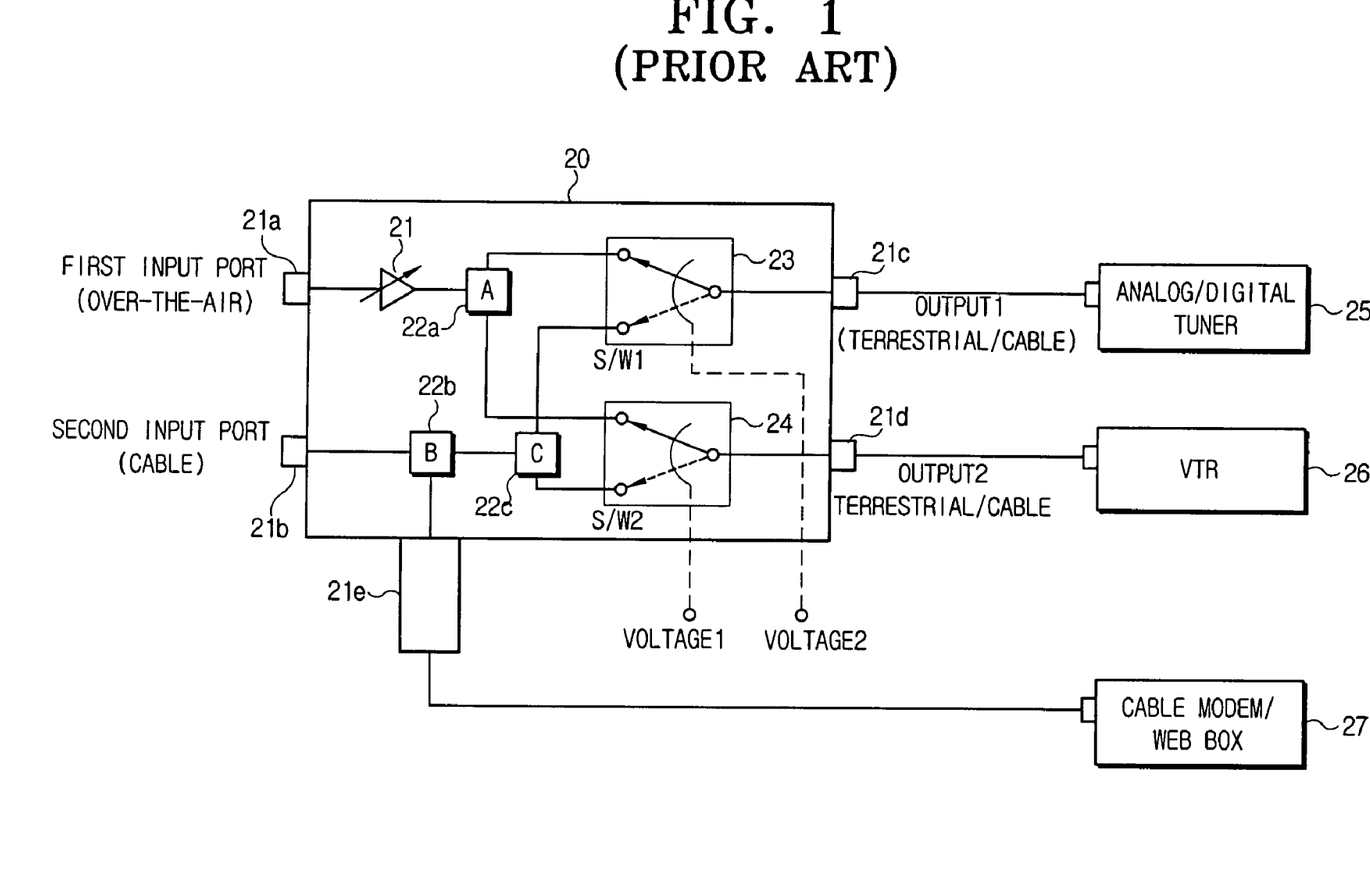
FIG. 1 is a block diagram illustrating a signal-receiving system using a conventional multi-inputs and multi-outputs switching device.
Figure 2:
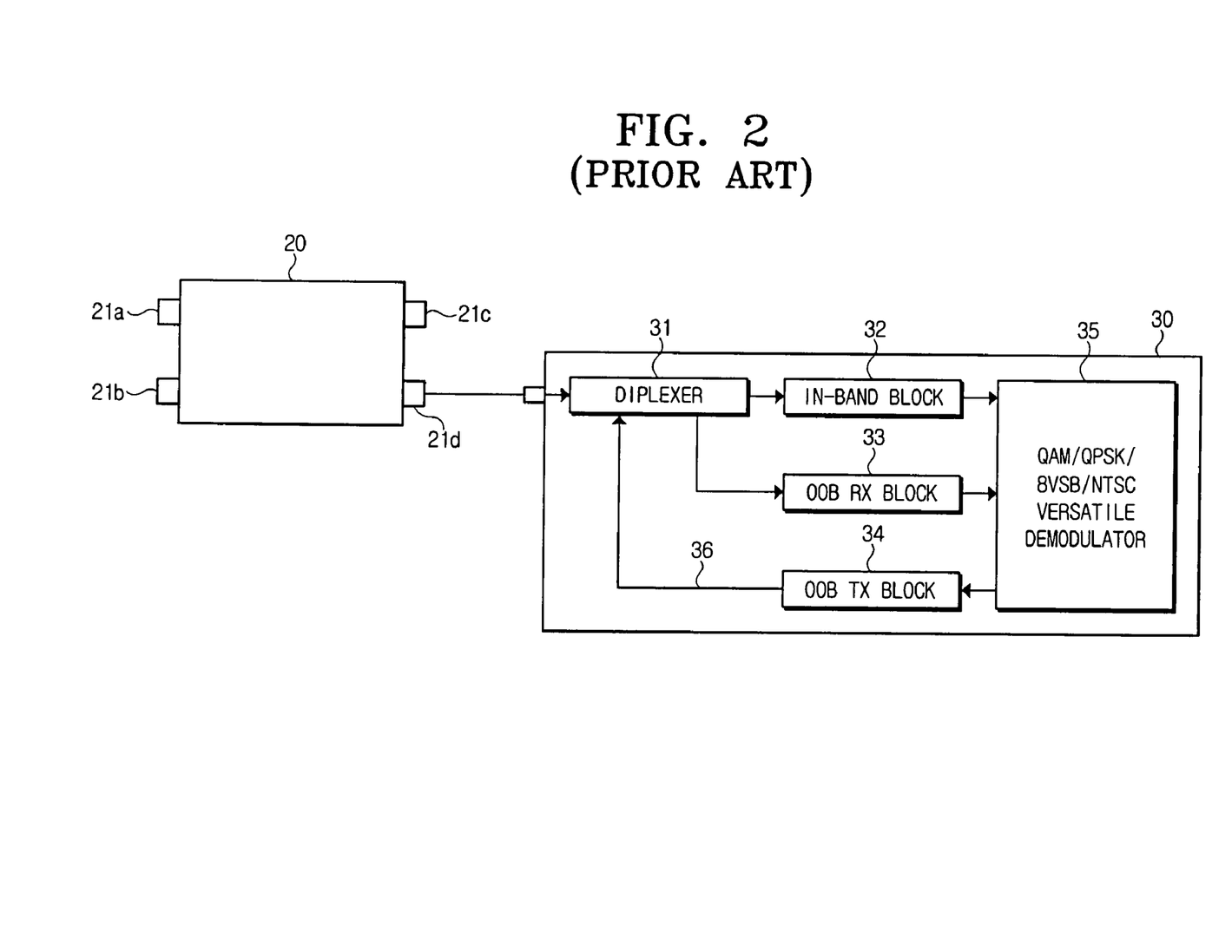
FIG. 2 is a block diagram illustrating a signal-receiving system having a PIP function of FIG. 1.

FIG. 1 and FIG. 2 are views illustrating a multi-input and multi-output switching device and a receiver having the same, which are disclosed in the Korean patent publication number of 01-2003-54438.

FIG. 1 is a block diagram illustrating a signal-receiving system using a conventional multi-input and multi-output switching device, and FIG. 2 is a block diagram illustrating a signal-receiving system having a PIP function as shown in FIG. 1. The first input port 21a of the multi-input and multi-output switching part 20 is connected to an antenna for terrestrial waves, and the second input port 21b of the same is connected to cable, the first output port 21c is connected to a tuner 25 for both analog and digital signals, the second output port 21d of the same is connected to the VTR 26, and the loop-through output port 21e of the same is connected to a cable modem or a web box 27.

Thus, the first splitter circuit 22a is connected to the first input port 21a, and splits into two signals an analog or a digital terrestrial broadcast signal past through a low noise amplifier (LNA) 21. The third splitter circuit 22c splits into two signals an input signal, that is, a cable broadcast signal, of the second input port 21b that is applied through the second splitter circuit 22b. The first switching circuit 23 operates according to an external control signal (second voltage), and applies to the first output port 21c one of the first split signal of the first splitter circuit 22a and the first split signal of the third splitter circuit 22c. The second switching circuit 24 operates according to an external control signal (first voltage), and applies to the second output port 21d one of the second split signal of the first splitter circuit 22a and the second split signal of the third splitter circuit 22c. Thus, the first and second output ports 21c and 21d can output a terrestrial broadcast signal or a cable broadcast signal, respectively. That is, signals to be output to the first and second output ports 21c and 21d can be diversely selected depending on the structure of a signal-receiving system.

The loop-through output port 21e is a port used upon two-way communications through cable connected to the second input port 21b, connected to a cable modem or the web box 27. Data input to and output from the loop-through output port 21e has different bands from the cable broadcast signal, so that the data is output to the second input port 21b through the second splitter circuit 22b regardless of the receptions of the cable broadcast signal, and sent to the cable.

Since an RF splitter is needed to implement a PIP function, the RF splitter necessarily selects and outputs either a terrestrial signal or a cable signal to the first output port 21c and the second output port 21d. The tuner connected to the first output port 21c is a sub tuner, and has a compatible tuner 25 generally carrying out the digital (8VSB) and analog (NTSC) functions to implement the 2 PIP since the turner 25 can input a digital signal or an analog signal as an over-the-air broadcast signal. The tuner connected to the second output port 21d has functions capable of processing diverse digital signals for QAM, QPSK, and 8VSB, and a NTSC signal, and operates as a main tuner 30 (refer to FIG. 2).

If a terrestrial waves (a 8VSB digital signal or an NTSC analog signal) are selected and output to the first and second output ports 21c and 21d, four PIPs such as digital-digital, analog-analog, analog-digital, and digital-analog PIPs can be achieved. The electromagnetic field intensity of an over-the-air signal of terrestrial wave can be very low, and, if the electromagnetic field intensity of a signal is very low, the low noise amplifier 21 operates. In general, the low noise amplifier 21 operates only in the over-the-air input mode since the electromagnetic field intensity of a cable signal is appropriate.

If an input signal for cable is output to the first and second output ports 21c and 21d in the same manner, it is configured to carry out fourfold PIPs even in the case that a terrestrial wave is selected at the first output port 21c and a cable signal is selected at the second output port 21d, or, the cable signal is selected at the first output port 21c and the terrestrial wave is selected at the second output port 21d.

However, the conventional technologies for the above configuration have problems as below.

Since one low noise amplifier 21 is used for the first input port (or over-the-air input port) 21a and an output signal of the low noise amplifier 21 is commonly applied to the first and second output ports 21c and 21d, a sub screen completely disappears and then appears in two seconds every time the channels of the main tuner 30 are changed or scanned, when the tuner 25 is set to a specific channel. In detail, in case of the 2 PIP, in fact, it hardly tells which screen is the main or the sub screen. Thus, the sub screen can be displayed as a small window on the screen, but the screen can be divided in halves to have a dual window. Furthermore, the characteristics of a digital signal cause a screen to completely disappear and then appear after quite a while, that is, in about two seconds, over the extent that the screen momentarily shivers, since the digital channel demodulator operates again in case of failure in locking as well as the MPEG and AC-3 decoding blocks at next stages have to newly process a signal. To overcome the above problems, it can be considered to install the low noise amplifier 21 only on the side of the main tuner 30, but, in this case, the performance of the tuner 25 can be degraded if the electromagnetic field of a signal is weak. That is, in case of the 2 PIP, as stated above, in order to prevent a severe transient state of a digital signal, the tuner is not controlled, but a video signal at rear stages is changed, in the swapping mode of the main and sub screens. In case of the 2 PIP, the tuner is not directly controlled since there are various functions, that is, various swapping functions such as smooth swapping function of main and sub screens, but the video signal at rear stages is switched to each other. However, the low noise amplifier 21 is installed only on the side of the main tuner 30, so that, if the main and sub screens are swapped, the sub tuner 25 having no low noise amplifier (LNA) 21 serves as the main tuner 30 and the main tuner 30 having the low noise amplifier 21 serves as the sub tuner 25. Since the sub tuner 25 having no low noise amplifier 21 serves as the main tuner 30, the performance of the main tuner 30 becomes degraded.

The United States has adopted the one-way OpenCable standards, but the Republic of Korea has adopted the two-way OpenCable standards. The United States are to adopt the two-way OpenCable standards. Thus, in the existing one-way standards, there is no problem in that the OOB RX block 33 receives a signal through the diplexer 31 inside the main tuner 30. On behalf of the Return channel, the main tuner 30 has therein the blocks of OOB RX 33 (receiving signals) and OOB TX 34 (transmitting signals) connected with the diplexer 31 by a cable 36. In the above, the OOB (Out of band) refers to a channel separately providing information on encoding keys, channel modulation modes, and other channel tables. The main tuner is also capable of handling In-Band signals with an In-Band block 32, and the main tuner also has a demodulator 35 capable of processing both OOB and In-Band signals. The two-way OpenCable tuner 30 has the diplexer 31 therein since the existing two-way cable modems are mostly the set-top boxes without consideration of PIP functions. However, in the OpenCable market in the future, if the television sets having a Cable signal-receiving function is compulsorily installed with a CableCARD and has the two-way function instead of the one-way function currently widespread, high-quality television sets with the conventional RF splitter and tuner can not have the two-way function since it is provided with the PIP function. In order to implement the two-way OpenCable, the input port (second splitter circuit 22b of FIG. 1) of the tuner 20 has to be split, so one of the split input ports is used for the In-Band channel and the other of the same is used for the Out-of-Band (OOB). If the RF splitter is used prior to the tuner on behalf of the general PIP function, there occurs a problem of interrupting a path from the signal-receiving stage to the signal-transmitting stage for the OOB return channel since amplifiers of the RF splitter have one-way characteristics. That is, the above prior art has the loop-through output port 21e as a port for two-way communications, but, since the RF splitter supports one-way communications as above, there occurs a problem in that the two-way OpenCable can not be implemented while having the PIP function.

There occurs a problem in the prior art in that the PIP mode using the cable and terrestrial signals can not be implemented due to the interferences of the cable and terrestrial signals in the same channel.

SUMMARY OF THE INVENTION

An aspect of the present general inventive concept is to solve at least the above drawbacks and/or other problems associated with the conventional arrangement. Accordingly, an aspect of the present general inventive concept is to provide a multi-input and multi-output device and tuner for two-way OpenCable enabling a PIP function and the two-way OpenCable to be implemented wherein a diplexer may be placed prior to a RF splitter amplifier, a signal past through the diplexer may be supplied to a loop-through output stage and an OOB block, and a signal passing through the amplifier may be supplied to a In-Band block and a sub tuner.

Another aspect of the present general inventive concept is to provide a multi-input and multi-output device and tuner for two-way OpenCable capable of solving the problem of interferences in the same channel by using a shield cable instead of PCB patterns as a cable or a terrestrial signal path inside an RF splitter.

Yet another aspect of the present general inventive concept is to provide a device capable of independently controlling two low-noise amplifiers installed in an RF splitter in order to solve a severe transient state of a sub screen when a channel of a main screen is changed.

Additional aspects and advantages of the present general inventive concept will be set forth in part in the description which follows and, in part, will be obvious from the description, or may be learned by practice of the general inventive concept.

The foregoing and/or other aspects and advantages of the general inventive concept may be substantially realized by providing a multi-input and multi-output device to be used with a digital television comprising an over-the-air signal input port connected for an over-the-air signal; a cable signal input port connected for a cable signal; and at least one or more splitters to split the over-the-air signal or the cable signal to plural output ports, and a shield cable used to connect the splitter and the over-the-air signal input port, and/or to connect the splitter and the cable signal input port. The multi-input and multi-output device may further comprise an amplifier between the cable signal input port and the splitter, the splitter being connected to the cable signal input port, wherein an Out-of-Band (OOB) port is provided between the cable signal input port and the amplifier.

The over-the-air signal port may be connected through low noise amplifiers (LNA) to the splitters, and the low noise amplifiers may be independently controlled to be turned on and off according to an external control signal.

The multi-input and multi-output device may further comprise a loop-through output port connected to the cable signal input port, wherein the loop-through output port may be cut off by an external loop-through cut-off signal.

According to an aspect of the present general inventive concept, each splitter can select and output any of the cable signal and the over-the-air signal according to the external control signal, and the splitter connected to the low noise amplifier turned on by the external control signal can be controlled to output a signal of the low noise amplifier.

A diplexer may be provided to the cable signal input port and a signal past through the diplexer can be applied to the OOB input and output port, the loop-through output port, and the plural splitters.

The foregoing and/or other aspects and advantages may also be substantially realized by providing a two-way communication OpenCable tuner, comprising an OOB input and output port for two-way communications; an In-Band input port; and a demodulator to process and output a signal input from the In-Band input port, and, at the same time, process a signal input from the OOB input and output port as OOB data or process externally input OOB data to the OOB input and output port as two-way data.

The two-way communication OpenCable tuner may further comprise an OOB tuner block to tune a cable signal input from the OOB input and output port and output the tuned signal to the demodulator, or to process a signal output from the demodulator and output the processed signal to the OOB input and output port; and an In-Band tuner block to tune and output an In-Band signal to the demodulator, the In-Band signal being input from the In-Band input port.

The OOB tuner block may inlcude a diplexer comprising a signal reception and transmission filter to filter the received and transmitted OOB data; a OOB signal-transmitting block to receive OOB data from the demodulator and transmit the received OOB data to the diplexer; and an OOB signal-receiving block to process and output a signal from the diplexer to the demodulator, the signal being transmitted from the diplexer.

According to an aspect of the present general inventive concept, the two-way communication OpenCable tuner may further comprise a shield wall to shield a mutual interference signal between the OOB tuner block and the In-Band tuner block, and, at the same time, may further comprise a shield wall to shield a mutual interference signal between the demodulator and the OOB tuner block and In-Band tuner block to prevent distortion due to the signal interferences.

The diplexer, OOB signal-transmitting block, and OOB signal-receiving block may each have a shield wall to shield the mutual interference signal.

The foregoing and/or other aspects and advantages may also be substantially realized by providing a high-quality digital television having a digital picture-in-picture function, comprising a multi-input and multi-output device having at least one or more splitters to split an over-the-air input signal and a cable input signal into over-the-air signals and cable signals and transmit the over-the-air signals and cable signals to plural output ports, and an OOB input and output port connected to at least one or more of the splitters for bidirectional cable signal communications; an OpenCable tuner to demodulate and output a signal input from an OOB input and output port, connected to the OOB input and output port of the multi-input and multi-output device, and from an In-Band input port, and, at the same time, demodulate a signal input from and output to the OOB input and output port of the OpenCable tuner and output two-way data; and a sub tuner to demodulate analog and digital signals output from the splitter and output the demodulated analog and digital signals.

The multi-input and multi-output device may apply the over-the-air input signal to at least one of the splitters through low noise amplifiers (LNA), and each low noise amplifier may be independently turned on and off by an external control signal, and the high-quality digital television may further comprise a loop-through output port connected to a cable input signal, the loop-through output port being cut off by an external loop-through cut-off signal.

The splitter connected to the low noise amplifier turned on by the external control signal may be controlled to output a signal passing through the low noise amplifier, so the number of control signals can be reduced.

Shield cable may be used for the splitter to split the over-the-air signal and/or the splitter to split the cable signal, so noise in the same channel is prevented.

According to an aspect of the present general inventive concept, the two-way OpenCable tuner may further include an OOB tuner block to tune a cable signal input from the OOB input and output port of the OpenCable tuner and output a signal to the demodulator, or to process a signal output from the demodulator and output the processed signal to the OOB input and output port of the OpenCable tuner; and an In-Band tuner block to tune an In-Band signal input from the In-Band input port and output the tuned In-Band signal to the demodulator, and the OOB tuner block includes a diplexer comprising signal transmission and reception filters to filter the received and transmitted OOB data; an OOB signal transmission block to receive the OOB data from the demodulator and transmit the OOB data to the diplexer; and an OOB signal reception block to process a signal transmitted from the diplexer and output the processed signal to the demodulator.

According to another aspect of the present general inventive concept, a plurality of shield walls may be further provided to cut off a mutual interference signal between the OOB tuner block and the In-Band tuner block, among the OOB tuner block, In-Band tuner block, and modulator, and among the diplexer, OOB signal transmission block, and OOB signal reception block to cut off mutual interference signals.

The multi-input and multi-output device may have a diplexer for the cable signal input port, and a signal from the diplexer of the multi-input and multi out put device is applied to the OOB input and output port of the multi-input and multi output device, loop-through output port, and plural splitters so as to enable the bidirectional communications.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
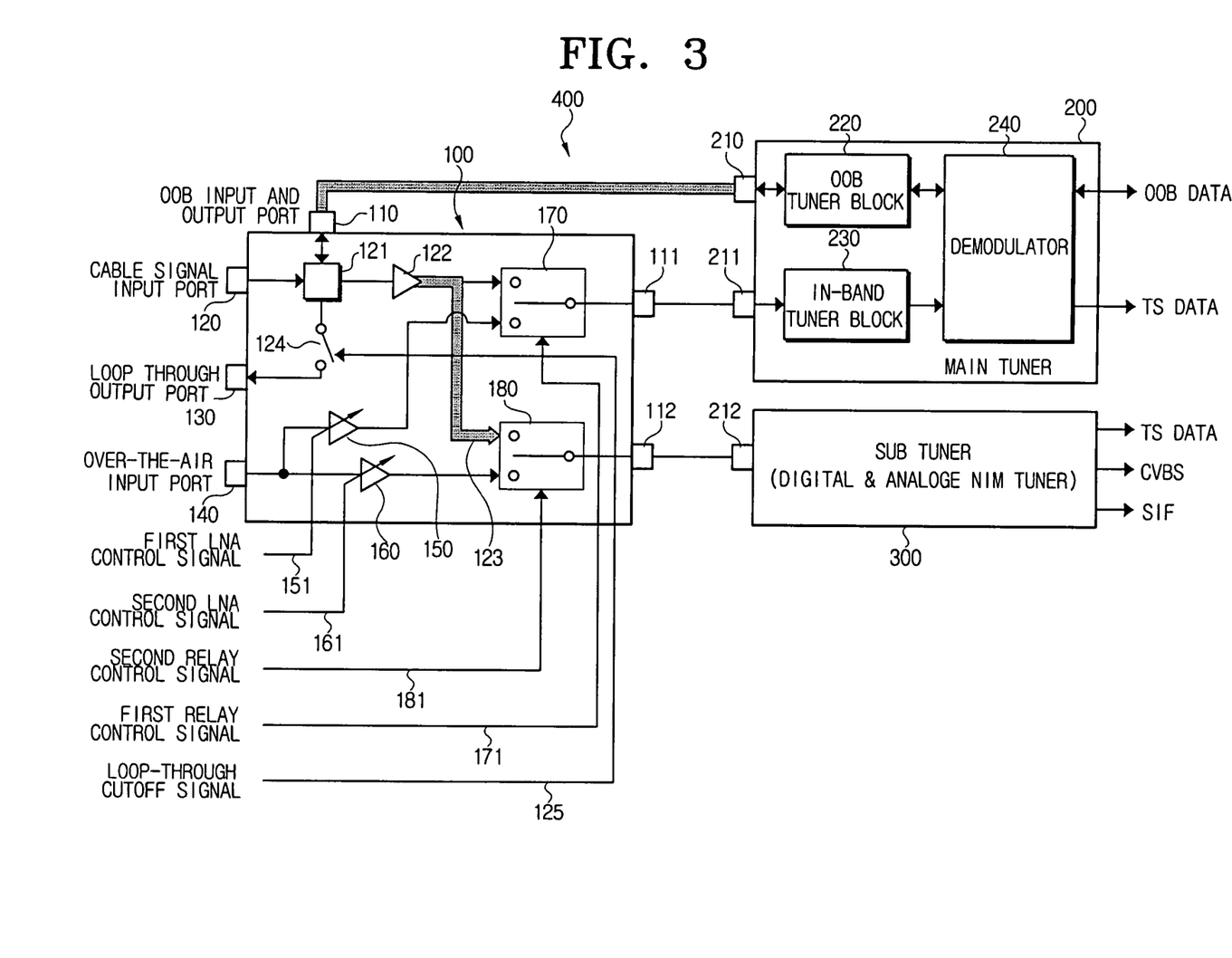
FIG. 3 is a block diagram illustrating a splitter and tuner for two-way OpenCable according to an aspect of the present general inventive concept.
Figure 4:
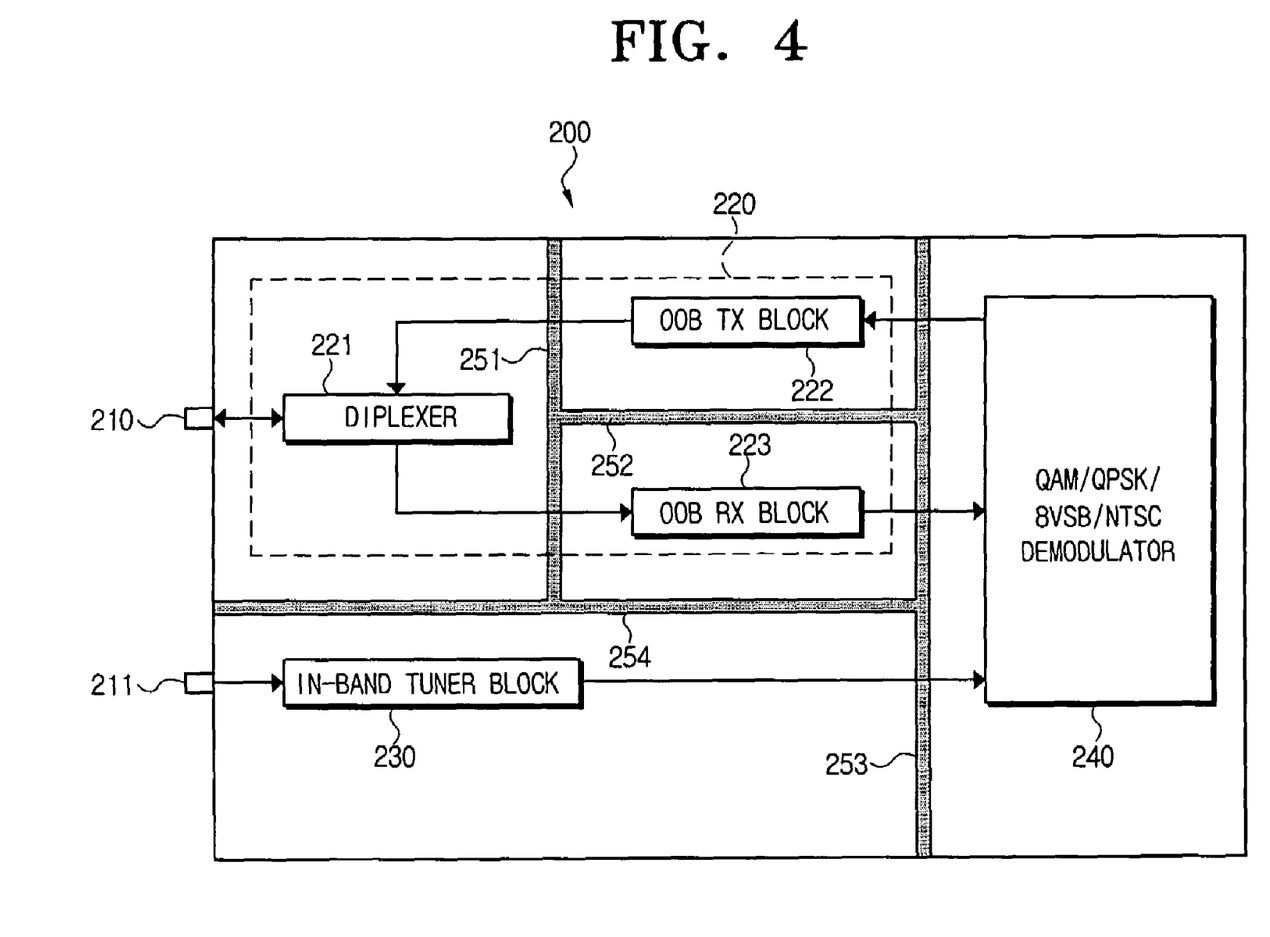
FIG. 4 is a view illustrating a structure of a main tuner according to an aspect of the present general inventive concept.

FIG. 3 is a block diagram illustrating a splitter and tuner 400 for two-way OpenCable according to an aspect of the present general inventive concept, and FIG. 4 is a view illustrating a structure of a main tuner 200.

Since the above structures of FIGS. 3 and 4 according to an aspect of the present general inventive concept are for effectively implementing a two-way OpenCable system and a 2 PIP function and the basic operations of the structures of FIGS. 3 and 4 are similar to those of the conventional structures, detailed description on the structures of FIGS. 3 and 4 will be omitted but the characteristic components of the same.

As shown in FIGS. 3 and 4, the two-way OpenCable splitter and tuner 400 according to an aspect of the present general inventive concept may comprise an RF splitter 100, the main tuner 200, and a sub tuner 300.

The RF splitter 100 can split a signal of a cable signal input port 120 to a loop-through output port 130, an amplifier 122, and an OOB input and output port 110, through a diplexer 121, and a signal input to the over-the-air input port 140 can be input to a first relay 180 and a second relay 170, respectively, to prevent transient states upon implementing the 2 PIP function. In general, the loop-through output port 130 may be connected to a video recording device such as VTR. Low-noise amplifiers 150 and 160 may be structured to be controlled by a first low-noise amplifier (LNA) control signal 151 and a second low-noise amplifier (LNA) control signal 161, respectively. The low-noise amplifiers 150 and 160 may be structured in a Cross form so that fourfold PIP modes, such as cable-cable, cable-terrestrial, terrestrial-cable, and terrestrial-terrestrial, can all be implemented. In order to prevent interferences of cable signals and terrestrial signals, a signal line part 123 connected from the amplifier 122 to the first relay 180 may be formed of shield cable instead of PCB pattern. In order to implement the PIP function in the Cross form, the two relays 170 and 180 can be used for one existing relay. As the splitter structured in the Cross form needs more paths for the implementation of the 4 PIP modes, noise properties can be degraded. Accordingly, the loop-through output port 130 of the RF splitter 100 can output a loop-through cutoff signal 125 in a specific mode such as the cable-cable mode to cut off a switch 124, so that the loop-through output port 130 can have no output. The OOB input and output port 110 of the RF splitter 100 can be installed near the cable signal input port 120 to implement the two-way OOB, so that the diplexer 121 does not interrupt the flow of two-way signals.

The main tuner 200 operating as an OpenCable tuner may have two input ports 210 and 211, an OOB input and output port 210 and an In-Band input port 211, as well have a demodulator 240. The OOB input and output port 210 of the main tuner 200 may be connected to an OOB tuner block 220, and the In-Band input port 211 may be connected to an In-Band tuner block 230. The OOB tuner block 220 may further comprise a diplexer 221, an OOB TX block 222, and an OOB RX block 223. The main tuner 200 may have a shield wall 254 therein to shield signals between the OOB tuner block 220 and the In-Band tuner block 230 to prevent signal interferences, as well as shield walls 251 and 252 between the OOB TX block 222, OOB RX block 223, and the diplexer 221 of the OOB tuner block 220 to prevent the signal interferences. Signal interferences upon demodulation may be suppressed by a shield wall 253 to shield the demodulator 240 and the signal-processing blocks 220 and 230.

If the satellite signal is applied to the cable signal input port 120, the demodulator 240 can operate in the satellite channels receive mode.

Hereinafter, description will be made on the flows of cable or terrestrial input signals of the RF splitter 100 according to operations of the first and second low-noise control signals 151 and 161.

As shown in FIGS. 3 and 4, the signal from the cable signal input port 120 can be applied to the first and second relays 180 and 170 through the diplexer 121 of the RF splitter 100 and through the OOB input and output port 110 of the RF splitter 100, the loop-through output port 130, and the amplifier 122.

According to an aspect of the present general inventive concept, if the first and second low-noise control signals 151 and 161 are turned on so that the first and second low noise amplifiers 150 and 160 are activated, the relays 170 and 180 output an over-the-air signal input from the over-the-air input port 140 by a first and second relay control signals 181 and 171. Accordingly, the over-the-air signal output from an In-Band output port 111 through the second relay 170 may be input to the In-Band signal-receiving port 211 of the main tuner 200, tuned in the In-Band tuner block 230, digitally demodulated in the demodulator 240, and output as transport stream data (TS data). A cable signal is applied all the time from the OOB input and output port 110 of the RF splitter 100 to the OOB input and output port 210 of the main tuner 200 through a shield cable, and sent to and received from the OOB TX block 222 and the OOB RX block 223 through the diplexer 221 of the OOB tuner block 220, and two-way communications are enabled through the demodulator 240. The over-the-air signal output from a sub-tuner output port 112 through the first relay 180 can be input through a sub-tuner input port 212 of the sub tuner 300 is tuned and demodulated in the sub tuner 300, output as TD data and/or CVBS (composite video signal) and SIF, and processed in a signal-processing block (not shown) for display. Therefore, main and sub screens all can operate in the over-the-air mode in the 2 PIP mode.

With the operations as described above, if the first low-noise control signal 151 is turned on and the second low-noise amplifier 161 is turned off, the first low noise amplifier 150 can be turned on so that the over-the-air signal is sent to the second relay 170, the first relay control signal 181 controls the first relay 180 to select a cable signal, and the second relay control signal 171 controls the second relay 170 to select the over-the-air input. Thus, the over-the-air signal output from the In-Band output port 111 through the second relay 170 can be input through the In-Band input port 211 of the main tuner 200, tuned in the In-Band tuner block 230, digitally demodulated in the demodulator 240, and output as transport stream data. The sub tuner 300 selects and outputs a cable signal input from the cable signal input port 120. In the 2 PIP mode as above, the main screen can be displayed in the over-the-air mode and the sub screen can be displayed in the cable mode.

If the first low-noise control signal 151 is turned off and the second low-noise amplifier 161 is turned on, the second relay control signal 171 controls the second relay 170 to select a cable signal, the first relay control signal 181 controls the first relay 180 to select an over-the-air signal, and the second relay control signal 171 controls the second relay 170 to select a cable signal, the cable signal and the over-the-air signal are sent to the main tuner 200 and the sub tuner 300, respectively. Therefore, in the 2 PIP mode, the main screen can operate in the cable mode, and the sub screen can operate in the over-the-air mode.

If the first and second first low-noise control signals 151 and 161 are turned off, both of the main tuner 200 and the sub tuner 300 can select and output a cable signal, so all of the main and sub screens can operate in the cable mode in the 2 PIP mode. In such a case, since the diplexer 121 of the RF splitter 100 has more split paths so that the noise properties can be degraded, the loop-through output port 130 of the RF splitter 100 may have no output due to the switch-off of the switch 124 by the loop-through cutoff signal 125.

It has been described that respective system controllers (not shown) output the first low-noise control signal 151, the second low-noise control signal 161, the first relay control signal 181, and the second relay control signal 171, according to an aspect of the present general inventive concept, but the number of ports for the control signals 151, 161, 171, and 181 can be reduced by a structure that the second low-noise amplifier 161 and the first relay control signal 181 interactively operate to each other. That is, it can be structured for the second relay control signal 171 to select an over-the-air signal if the first low-noise control signal 151 is turned on, and for the first relay control signal 181 to select the over-the-air signal if the second low-noise control signal 161 is turned on.

According to an aspect of the present general inventive concept, no output signal may be applied to the loop-through output port 130 if the loop-through cutoff signal 125 is output from a system controller (not shown) and all the main and sub tuners 200 and 300 select a cable signal, but the loop-through cutoff signal 125 is applied to the loop-through output port 130 only when the first low-noise control signal 151 and the second low-noise control signal 161 are turned off, so it can be structured that separate signals 125, 151, and 161 from the system controller (not shown) are eliminated by the combination of the signals 125, 151, and 161.

The present general inventive concept may place the OOB input and output port 110 of the RF splitter 100 before the cable signal input port 120 and the amplifier 122 so that a cable signal is input to and output from the OOB input and output port 110 of the RF splitter 100 all the time, may uses two relays 170 and 180 for the PIP function, and may have two more ports for controls of the relays 170 and 180. In order to prevent transient states upon channel changes, the present invention uses the independently operating low noise amplifiers 150 and 160 in the respective paths for a terrestrial signal input, and the loop-through output port 130 is designed to have no output in a specific mode since the noise figure (N.F.) properties can be degraded as more paths are needed for the structure of the splitter 100, and, in order to prevent interferences in the same channel, the shield cable can be used, rather than the PCB pattern, for either a cable signal path or a terrestrial signal path inside the RF splitter 100.

According to anotheraspect of the present general inventive concept, the OpenCable system may place the OOB input and output port 110 of the RF splitter 100 after the cable signal input port 120 and before the amplifier 122, and may have two independent OOB and In-Band input ports 210 and 211 of a main tuner 200, so as to perform a two-way signal process at the same time of performing the PIP function. The RF splitter 100 can be structured in the Cross form so that the PIP function can be implemented for all the cable signal and terrestrial signal, and the loop-through output port 130 can have no output in a specific mode in consideration of the noise properties. Therefore, the present general inventive concept can enable the two-way OpenCable system to be constructed very effectively at the same time of implementing the terrestrial signal 2 PIP which will be essential to requirements of high-quality digital TVs in the future.

The present general inventive concept can prevent transient states upon channel changes by using the independently operating low noise amplifier 150 and 160 in each terrestrial signal path.

The present general inventive concept can be equipped with the main tuner 200 having the OOB input and output port 210 and the In-Band input port 211, and each block 220, 221, 222, 223, 230, and 240 can have an inner-tuner shield wall 251-254 to eliminate the signal interferences, and the shield cable may be used, rather than the PCB pattern, for either the cable signal or the terrestrial signal path in the RF splitter 100 to prevent the signal interferences in the same channel.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A digital television having a digital picture-in-picture function, comprising:
    a multi-input and multi-output device having at least one or more splitters to split an over-the-air input signal and a cable input signal into over-the-air signals and cable signals and transmit the over-the-air signals and cable signals to plural output ports, an OOB input and output port to communicate bidirectionally and to be connected to at least one or more of the at least one or more splitters, and a diplexer for the cable signal input port, and a signal from the diplexer is applied to the OOB input and output port of the multi-input and multi-output device, a loop-through output port, and the plural splitters;
    an OpenCable tuner to demodulate and output a signal input from an OOB input and output port, connected to the first OOB input and output port of the multi-input and multi-output device, and from the In-Band input port, and, at the same time, to demodulate a signal input from and output to the OOB input and output port and output two-way data; and
    a sub tuner to demodulate analog and digital signals output from the splitter and output the demodulated analog and digital signals.

2. The digital television as claimed in claim 1, wherein the multi-input and multi-output device applies the over-the-air input signal to each of the one or more splitters through a respective low noise amplifier (LNA), and each respective low noise amplifier is independently turned on and off by a corresponding external control signal.

3. The digital television as claimed in claim 2, wherein each splitter connected to the respective low noise amplifier turned on by the corresponding external control signal is controlled to output a signal passing through the respective low noise amplifier.

4. The digital television as claimed in claim 2, wherein each splitter connected to the respective low noise amplifier turned on by the corresponding external control signal is controlled by the corresponding external control signal to output a signal passing through the respective low noise amplifier.

5. The digital television as claimed in claim 1, wherein the loop-through output port is connected to the cable input signal, the loop-through output port being cut off by an external loop-through cut-off signal.

6. The digital television as claimed in claim 1, wherein a shield cable is used to selectively connect one of the at least one or more splitters to the over-the-air signal input port and to selectively connect one of the at least one or more splitters to the cable signal input port.

7. The digital television as claimed in claim 1, wherein the two-way OpenCable tuner further comprises:
    an OOB tuner block to tune a cable signal input from the OOB input and output port of the two-way OpenCable tuner and output the tuned signal to the demodulator, or to process a signal output from the demodulator and output the processed signal to the OOB input and output port; and
    an In-Band tuner block to tune an In-Band signal input from the In-Band input port and output the tuned In-Band signal to the demodulator.

8. The digital television as claimed in claim 7, wherein the OOB tuner block includes:
    a diplexer comprising signal transmission and reception filters to filter the received and transmitted OOB data;
    an OOB signal transmission block to receive the OOB data from the demodulator and transmit the OOB data to the diplexer; and
    an OOB signal reception block to process a signal transmitted from the diplexer and output the processed signal to the demodulator.

9. The digital television as claimed in claim 7, wherein a shield wall is further provided to cut off a mutual interference signal between the OOB tuner block and the In-Band tuner block.

10. The digital television as claimed in claim 9, wherein a shield wall is further provided to cut off a mutual interference signal among the OOB tuner block, In-Band tuner block, and modulator.

11. The digital television as claimed in claim 10, wherein the diplexer, OOB signal transmission block, and OOB signal reception block each have a shield wall for cutting off mutual interference signals.

12. A method of operating a digital television having a digital picture-in-picture function, the method comprising:
inputting an over-the-air signal through an over-the-air signal input port;
inputting a cable signal through a cable signal input port;
splitting the over-the-air signal and applying the over-the-air signal to a first relay and a second relay;
splitting the cable signal and applying the cable signal to the first relay and to the second relay through an OOB input and output port here the splitting comprises applying the cable signal through a diplexer, splitting the cable signal and applying the cable signal to the OOB input and output port, a loop through output port, and through an amplifier to the first relay and the second relay;
controlling the first relay to transmit a sub signal, the sub signal being one of the over-the-air signal and the cable signal, through a sub tuner output port to a sub tuner;
controlling the second relay to transmit a main signal, the main signal being one of the over-the-air signal and the cable signal, through an In-Band tuner block of a two-way communication OpenCable tuner;
tuning the main signal in the In-Band tuner block and outputting the tuned signal to a demodulator;
processing the tuned signal in the demodulator and outputting the processed signal to be displayed on a main screen;
tuning, demodulating and outputting the sub signal from the sub tuner to be displayed on a sub screen; and
enabling two-way communications by connecting the OOB input and output port to an OOB tuner block of the two-way communication OpenCable tuner.

13. The method as claimed in claim 12, wherein the applying of the over-the-air signal to the first relay comprises applying the over-the-air signal through a first low noise amplifier, and the applying of the over-air-signal to the second relay comprises applying the over-the-air signal through a second low noise amplifier.

14. The method as claimed in claim 13, wherein the controlling of the first relay to transmit a sub signal further comprises controlling a first low noise control signal to activate the first low noise amplifier if the sub signal is the over-the-air signal, and controlling the first low noise control signal to deactivate the first low noise amplifier if the sub signal is the cable signal, and the controlling of the second relay to transmit a main signal further comprises controlling a second low noise control signal to activate the second low noise amplifier if the main signal is the over-the-air signal, and controlling the second low noise control signal to deactivate the low noise amplifier if the main signal is the cable signal.

15. The method as claimed in claim 12, further comprising:
controlling the loop through output port to have no output by controlling a loop through cut off signal to cut off a switch when the main signal is the cable signal and the sub signal is the cable signal.

16. The method as claimed in claim 12, wherein the enabling of the two-way communications further comprises;
transmitting the cable signal as OOB data through the OOB input and output port to the OOB tuner block;
filtering the OOB data in a diplexer and outputting the filtered OOB data to a OOB signal receiving block;
processing the OOB data received from the diplexer in the OOB signal receiving block and outputting the processed OOB data to the demodulator;
processing the OOB data received from the OOB signal receiving block in the demodulator;
processing externally input OOB data in the demodulator and outputting the processed externally input OOB data to a 0GB signal transmitting block;
receiving the externally input OOB data output by the demodulatorin the OOB signal transmission block and transmitting the received externally input OOB data to the diplexer; and
filtering the externally input OOB data received from the OOB signal transmission block and outputting the filtered externally input OOB data to the OOB input and output port.

17. The method as claimed in claim 16, further comprising:
shielding a mutual interference signal between the OOB tuner block and the In-Band tuner block with a shield wall.

18. The method as claimed in claim 17, further comprising:
shielding a mutual interference signal between the demodulator, the OOB tuner block and In-Band tuner block with a shield wall.

19. The method as claimed in claim 18, further comprising:
shielding a mutual interference signal of the diplexer, the OOB signal transmitting block, and the OOB signal receiving block with a shield wall.

* * * * *